Patented Jan. 26, 1954

2,667,184

UNITED STATES PATENT OFFICE 2,667,184

HYDROSTATIC COUPLING

Albert Henry Hailer, Isleworth, and Frank Stanley Saunders, London, England; said Hailer assignor to Alltools Limited, Brentford, England Application October 28, 1952, Serial No. 317,188

Claims priority, application Great Britain February 5, 1952

4 Claims. (Cl. 137—791)

It is customary in instruments, for example pressure gauges and thermometers, which depend on the transmission of hydrostatic pressure from a pressure source to a gauge or the like, to use a pipe for transmitting the pressure and to couple the pipe to the pressure source and to the gauge by couplings of the screwed union and nipple type. Uncoupling for the purpose of replacing a gauge or pipe then entails some loss of liquid and there are circumstances in which such loss of liquid cannot be tolerated.

The object of this invention is to provide a coupling between two members in a line for transmitting hydrostatic pressure which, when uncoupled, will permit no leakage of fluid and which, when coupled, will afford little, if any, impediment to movement of liquid in either member in response to changes in pressure or temperature.

The invention accordingly provides a coupling between two members in a conduit for transmitting hydrostatic pressure comprising, in combination with a spigot end on each member, a flexible diaphragm covering each spigot end and forming a liquid tight joint therewith at its periphery and a detachable coupling member for securing the two spigot ends together with the diaphragms in close abutment. When the members are uncoupled, the diaphragms will prevent leakage of liquid from them. When they are coupled together, the diaphragms will abut closely and serve to transmit pressure from the liquid contained in one member to that contained in the other member. There should be no pressure in the system when coupling or uncoupling, so that the diaphragms will then be flat and will abut closely over their whole area when the coupling is made. Space is provided in each spigot end to permit of the necessary small movement of the diaphragms when the system is subjected to pressure. If desired, provision may be made for escape of air from between the diaphragms.

The invention is of particular utility for establishing, in a hydrostatic weighing-machine of the kind described in U. S. Patent No. 2,392,702, couplings between the pressure generating unit, to which the object to be weighed is applied, and the gauge and a length of pipe line connecting the pressure generating unit and the gauge. One such application of the invention will now be described in detail, by way of example, with reference to the accompanying drawings, in which.

Figure 1:
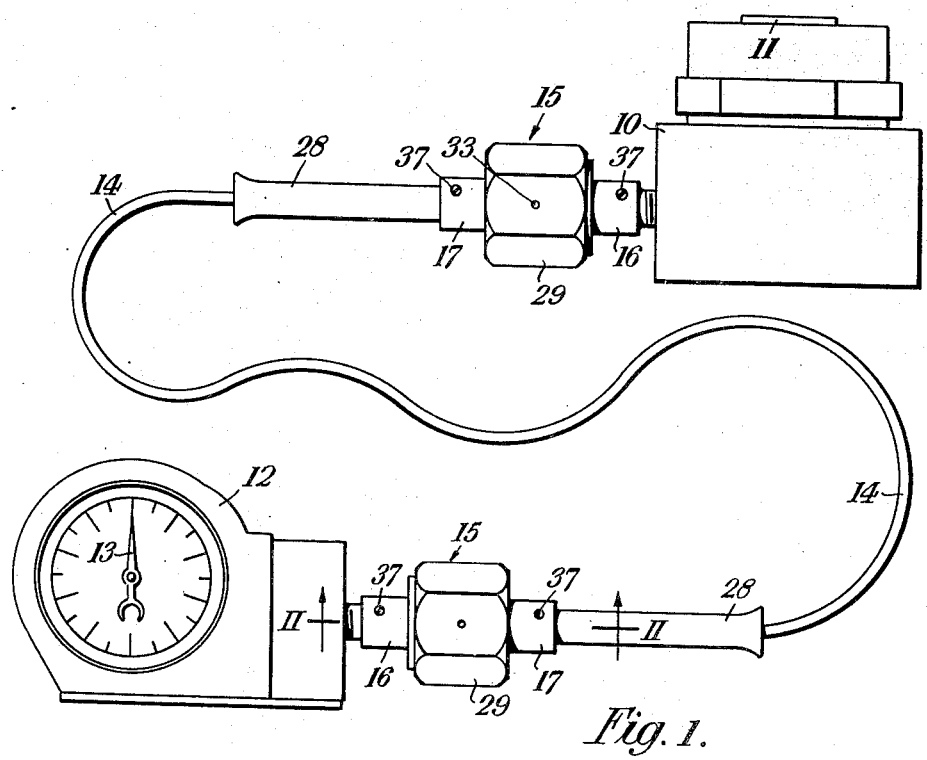
Fig. 1 is a side view of the weighing machine.

The weighing machine comprises a pressure generating unit 10 having a platform 11 to support the object to be weighed, a gauge 12 having a pointer 13 for indicating the weight of the object, and a capillary tube 14 for transmitting hydrostatic pressure from the generating unit 10 to the gauge 12.

Detachable couplings 15 connect spigot ends 17 on each end of the capillary tube 14 to spigot ends 16 projecting respectively from the unit 10 and the gauge 12. These couplings are precisely similar, and accordingly only the coupling 15 connecting the tube 14 and the gauge 12 is illustrated in detail in the drawings.

The spigot end 16 has a narrow central bore 18 for the passage of the pressure transmitting liquid, which opens into a conical cavity 20. The spigot end has a screwed shank 21 which screws into the gauge 12, a packing washer 22 being inserted between the two parts. The open mouth of the cavity 20 is sealed by a rubber diaphragm 19, the periphery of which forms a liquid tight joint with the spigot end 16. To this end, the edge portion of the diaphragm is turned over to lie parallel with the axis of the spigot end 16 and formed with a peripheral bead 23 which is retained in a circumferential groove in the spigot end 16.

The spigot end 17 has a narrow central bore 24, into which is press fitted the end of the capillary tube 14. The bore 24 communicates with a conical cavity 25, similar to the cavity 20. The end of the spigot end 17 is sealed by a rubber diaphragm 26, precisely similar to the diaphragm 19, and secured to the spigot end 17 by a beaded rim 27 on the diaphragm which engages a circumferential retaining groove in the spigot end. Screwed to each of the spigot ends 17 is a length of tubing 28 for protecting the adjoining end of the capillary tube 14.

Figures 2, 3:
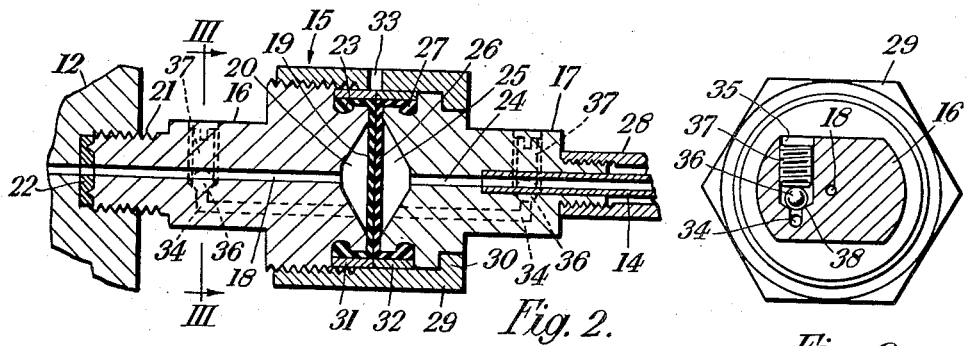
Fig. 2 is a section on a larger scale, on the line II—II in Fig. 1.
Fig. 3 is a section on the line III—III in Fig. 2.
Figure 4:
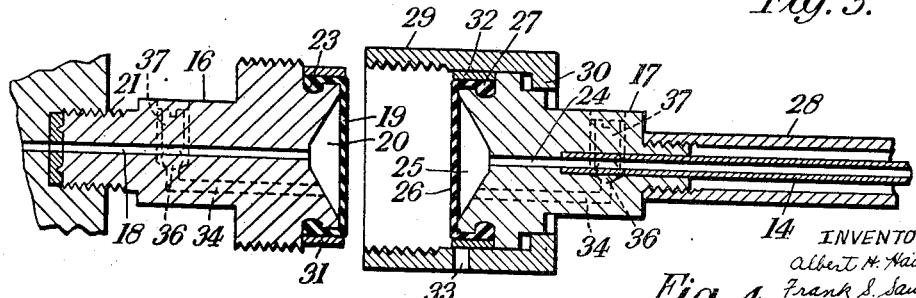
Fig. 4 is a view, similar to Fig. 2, but showing the two conduit members uncoupled.

The spigot end 16 is externally threaded and, to secure the spigot ends together, a union nut 29, having a flange 30, is fitted over the spigot end 17 and screwed to the spigot end 16 as shown in Fig. 2. Tubular metal distance pieces 31, 32 are fitted to the spigot ends, each of these surrounding the parts of the associated diaphragm which extend between the beaded edge of the diaphragm and the flat portion thereof which closes the spigot end. These distance pieces 31, 32 serve to limit the clamping pressure which can be applied to the diaphragms. This is of importance since if an excessive clamping pressure were applied by the spigot ends 16, 17 to the peripheral portions of the flat surfaces of the rubber diaphragms 19, 26 the rubber would flow inwardly and the diaphragms would become slack and incapable of transmitting changes in hydrostatic pressure from one spigot end to the other. An air escape hole 33 is provided in the union nut 29, opposite the abutting ends of the distance pieces 31, 32, to permit of escape of air which may be trapped between the diaphragms 19, 26. Each spigot end has an air bleeding vent 34 which leads from the conical cavity therein, at a point near the periphery of the diaphragm, to an outlet 35 containing a ball valve 36 and a bleed screw 37 (see especially Fig. 3) which can be screwed in to hold the ball valve 36 against a seating 38.

By means of the couplings 15 a long pressure transmitting capillary tube 14 may be coupled between the pressure generating unit 10 and the gauge 12. This narrow tube 14 may easily be inserted through small openings to connect the pressure generating unit to a remote gauge. If the capillary tube 14 should fracture, there will be no leakage of liquid from the pressure generating unit 10, despite the presence of pressure therein, since the diaphragms will be moved outwardly into the conical cavity in the spigot end 17 attached to the capillary tube and supported thereby against the pressure.

In addition to permitting of uncoupling of the gauge or pipe line without loss of liquid, and of safeguarding against loss of liquid from the pressure generating unit and gauge in the event of fracture of the pipe, the invention has the advantage that, since three separately sealed liquid-containing sections are involved, these may contain different liquids. Thus, in the case of a remote reading thermometer, it may be desired to use mercury in the pressure generating unit and also in the capillary tube but to use oil in the gauge. Furthermore, since the diaphragms can flex to some extent, the effects of thermal expansion or contraction of the liquid in the capillary tube are reduced to a minimum.

The three sections of the system are filled with liquid independently, air being bled out through the air bleeding vents during filling. The diaphragms are flat when there is no pressure but will deflect as pressure causes movement of the liquid. This movement for the purposes mentioned is small, the conical cavities provided in the spigot ends being sufficient in volume to cater for the necessary displacement of liquid.

What we claim as our invention and desire to secure by Letters Patent is:

1. In a conduit for transmitting hydrostatic pressure, the combination of two separable conduit members each having a spigot end, the spigot end of each conduit member having a narrow bore and a wider recess communicating with said bore, a pair of flexible diaphragms, each diaphragm covering one of said spigot ends and having a body portion covering and sealing the recess in said spigot end and having a cylindrical peripheral portion extending axially of said spigot end in contact with the outer wall of said spigot end and terminating in an enlarged bead accommodated in the circumferential retaining groove in said outer wall, said bead constituting the sole means for securing said diaphragm to said spigot end when said conduit members are separated, a detachable coupling member fitted over the ends of said conduit members to couple them together end to end with the body portions of said diaphragms in close abutment, and spacing means between said coupling member and the cylindrical portions of said diaphragms for relieving the diaphragms of clamping pressure, said spacing means and coupling member permitting of escape of air from between said diaphragms during coupling of said conduit members.

2. In a conduit for transmitting hydrostatic pressure, the combination of two separable conduit members each having a spigot end, the spigot end of each conduit member having a narrow bore and a wider recess communicating with said bore, a pair of flexible diaphragms, each diaphragm covering one of said spigot ends and having a body portion covering and sealing the recess in said spigot end and having a cylindrical peripheral portion extending axially of said spigot end in contact with the outer wall of said spigot end and terminating in an enlarged bead accommodated in a circumferential retaining groove in said outer wall, said bead constituting the sole means for securing said diaphragm to said spigot end when said conduit members are separated, a union nut for engaging said spigot ends and securing them detachably together with the body portions of said diaphragms in close abutment, and a pair of tubular distance pieces, one adapted to fit within each spigot end around the cylindrical portion of the diaphragm on said spigot end, said distance pieces cooperating to limit the clamping pressure applied by the union nut to the diaphragms, and the union nut having an air escape hole which, in the operative position of said nut, is opposite the abutting ends of said distance pieces.

3. In a conduit for transmitting hydrostatic pressure, the combination of two separable conduit members each having a spigot end, a pair of flexible diaphragms, each diaphragm having a body portion covering and sealing one of said spigot ends and having a cylindrical peripheral portion extending axially of said spigot end in contact with the outer wall of said spigot end and terminating in an enlarged bead accommodated in a circumferential retaining groove in said outer wall, said bead constituting the sole means for securing said diaphragm to said spigot end when said conduit members are separated, each of said spigot ends having an air bleeding vent leading from a point therein near the margin of the body portion of the diaphragm for allowing air to escape during filling of the associated conduit member with liquid, a union nut for engaging said spigot ends and holding them detachably together with the body portions of said diaphragms in close abutment, and spacing means adapted to fit between said spigot ends and within said union nut to relieve the diaphragms of clamping pressure when coupled together, said spacing means and union nut permitting of escape of air from between said diaphragms during coupling of said conduit members.

4. In a conduit for transmitting hydrostatic pressure, the combination of two separable conduit members each having a spigot end, the spigot end of each conduit member having a narrow bore and a wider recess communicating with said bore, a pair of flexible diaphragms, each diaphragm closing one of said spigot ends and having a body portion closing and sealing the recess in said spigot end and having a cylindrical peripheral portion extending axially of said spigot end in contact with a wall of said spigot end and terminating in an enlarged bead engaging a circumferential groove in said wall, said bead serving to secure said diaphragm to said spigot end when said conduit members are separated, and a detachable coupling member fitted over the ends of said conduit members to couple them together end to end with the body portions of said diaphragms in close abutment and without the application to said diaphragms of the full clamping pressure of said coupling member, said coupling member permitting of escape of air from between said diaphragms during coupling of said conduit members.

ALBERT HENRY HAILER.
FRANK STANLEY SAUNDERS.

References Cited in the file of this patent

UNITED STATES PATENTS

| Number | Name | Date |
|---|---|---|
| 2,091,207 | Kingsbury | Aug. 24, 1937 |
| 2,219,566 | Sauzedde | Oct. 29, 1940 |
| 2,392,702 | Saunders | Jan. 8, 1946 |

FOREIGN PATENTS

| Number | Country | Date |
|---|---|---|
| 761,812 | France | Dec. 14, 1932 |
| 577,283 | Great Britain | May 13, 1946 |